Aug. 22, 1950
C. A. MIZEN
2,519,778
PULSE STRETCHING CIRCUIT
Filed April 30, 1946
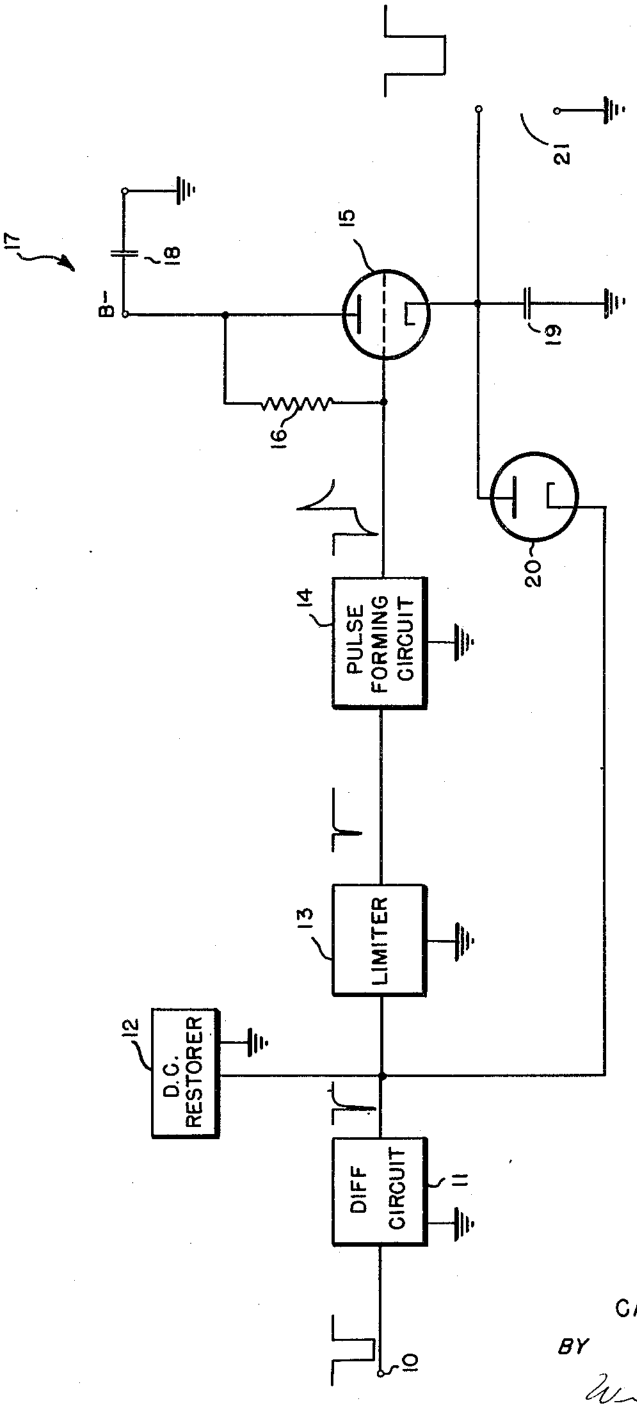
INVENTOR.
CARLTON A. MIZEN
BY
William D. Hall
ATTORNEY Patented Aug. 22, 1950

2,519,778

UNITED STATES PATENT OFFICE 2,519,778

PULSE STRETCHING CIRCUIT

Carlton A. Mizen, Cambridge, Mass., assignor to United States of America as represented by the Secretary of War Application April 30, 1946, Serial No. 666,003

4 Claims. (Cl. 250—27)

This invention relates to electrical circuits and more particularly to pulse conversion circuits.

In certain applications it is desirable to convert pulses of radio frequency energy into other pulses which have a constant width and which have an amplitude proportional to the amplitude of the original pulses.

Previous circuits have been designed which have functioned satisfactorily only as "pulse stretchers" or "pulse lengtheners" and have operated to produce a pulse expanded to some constant width from the input pulse. However, such pulse lengtheners have not produced output pulses which were proportional in amplitude to that of the input pulses. This difficulty is most pronounced when appreciable voltage or power is required of the output pulse wave.

Accordingly, an object of the present invention is to produce a pulse conversion circuit which is adapted to produce output pulses of constant width and of amplitude proportional to the amplitude of pulses applied to its input.

A further object of the invention is to produce such a pulse conversion circuit capable of furnishing considerable voltage or power in the output pulses.

Other objects and advantages of the invention will be apparent during the course of the following description.

In one embodiment of the invention the input pulses are applied to a standard constant-width-pulse generator (here a blocking oscillator type pulse generator). The output of this pulse generator is a negative-constant-width-pulse which is applied across the grid and cathode of a vacuum tube. A capacitance is connected in series with the external cathode circuit of this vacuum tube; this capacitance being electrically connected through a unilateral impedance (in this case, a diode) across the input pulse source; hence, the voltage across this capacitance when the vacuum tube is non-conducting will be proportional to the amplitude of the input pulses. The negative constant-width-pulse drives the grid highly negative, isolating the cathode and permitting the capacitance to charge through the diode to some negative voltage proportional to the amplitude of the input pulses. The negative output pulses are taken off across the capacitance. The vacuum tube is conducting during the final portion of its duty cycle to provide discharge of the capacitance, the grid of the tube being made positive by the positive "tail" of the applied pulse.

In the accompanying drawing, forming a part of this specification, the single figure shows a simplified combined-block-and-schematic diagram of one embodiment of this invention.

In the figure the lines from the blocks of the diagram represent the high voltage sides of the electrical connections, the remaining lines being at ground potential.

In the figure, numeral 10 designates an input terminal at which point the input pulses are applied. The input pulses are applied to a differentiating circuit 11 which produces a sharp differentiated pulse. A D. C. restorer 12 fixes the quiescent level of the output of differentiating circuit 11 and clips the positive portion of the differentiated pulses. The resultant pulses are applied to a limiter circuit 13 which produces pulses of uniform amplitude. These uniform amplitude pulses trigger a pulse-forming circuit 14 which produces pulses of constant width and of constant amplitude. These constant-width constant-amplitude pulses are applied to the grid of a vacuum tube 15 which is maintained quiescently in a non-conducting condition. The plate and the grid of tube 15 are maintained at a negative potential by a power supply 17, a suitable voltage being about 40 volts negative. A suitable blocking bias on the grid of tube 15 is obtained over resistance 16. Numeral 18 designates a by-pass condenser for anode voltage supply 17.

In series with the external cathode circuit of tube 15 is a capacitance 19 which is connected through a diode 20 to the output of differentiating circuit 11. Diode 20 serves as a unilateral impedance and makes the voltage on capacitance 19, when tube 15 is non-conducting, a function of the amplitude of the differentiated pulses of differentiating circuit 11 and hence a function of the amplitude of the input pulses at input terminal 10.

The operation of the circuit is as follows:

The tube 15 is customarily in a non-conducting condition. At the inception of the negative pulse from the pulse-forming circuit 14, the grid of tube 15 is driven sharply negative, thus causing no change in tube conductivity. During the pulse the voltage across capacitance 19 is negative with respect to ground and of an amplitude proportional to the amplitude of the input pulses at input terminal 10. The output pulses are then of constant width and of amplitude proportional to the amplitude of the input pulses and are taken off across output terminals 21. The positive "tail" of the applied pulse drives the grid of tube 15 positive and causes the tube to conduct, thus discharging capacitance 19.

It will be obvious that the circuit, as shown in the figure, has been practically reduced to the minimum number of components and would be completely reduced to the minimum number of components if the limiter 13 were removed.

Accordingly, it is obvious that various improvements, additions and modifications may be made to the circuit. For example, a number of ordinary pulse amplifiers may be inserted between the pulse input 10 and the differentiating circuit 11. The limiter stage 13 may be eliminated, if desired, but its inclusion generally gives more satisfactory operation and prevents spurious triggering of the pulse-forming circuit 14. The pulse-forming circuit 14 has not been specified since a wide variety of equivalents are possible (e. g. a blocking oscillator, a delay multivibrator, or a delay line oscillator). Low impedance sources, such as cathode followers, may be inserted in the customary manner at various points in the circuit to prevent pulse distortion due to loading effects. Thus, a cathode follower may be, and generally is, inserted between the pulse-forming circuit 14 and the grid of tube 15.

It will be obvious that there may be deviations from the invention as described which still fall fairly within the spirit and scope of the invention.

Accordingly all such deviations are claimed which fall fairly within the spirit and scope of the invention as identified in the hereinafter appended claims.

What is claimed is:

1. A pulse conversion circuit comprising an electron discharge tube having at least anode and cathode electrodes, a capacitor, a point of fixed potential, said capacitor being electrically connected between said cathode and said point of fixed potential, bias means connected between said point of fixed potential and said anode to maintain the impedance of said electron discharge tube normally high, means including a unilateral impedance forming a path for signal pulses of predetermined polarity in series with said capacitor for charging thereof to a potential determined by the amplitude of said signal pulses, means keyed by said signal pulses to generate negative-going pulses of constant duration and having trailing edges which are positive with respect to the leading edges, means responsive to said trailing edges to lower the impedance of said electron discharge tube sufficiently to quickly discharge said capacitor connected to said bias means, and an output circuit connected across said capacitor.

2. A pulse conversion circuit comprising an electron discharge tube having at least anode, cathode and grid electrodes, a source of negative bias potential connected to said anode, a capacitor connected between said cathode and said source, a resistor connecting said anode and grid, a source of pulse signals of a predetermined polarity, means, connected to said grids, responsive to said pulse signals to generate pulses having constant duration and having trailing edges which are positive with respect to the leading edges, means to impress said pulses upon said grid electrode, the potential of said trailing edges rising to an extent sufficient to overcome said negative bias potential and render said tube conducting, a circuit including a diode disposed in series with said capacitor and said pulse source for impressing said signal pulses upon said capacitor to charge it to a potential determined by said pulse signal amplitude, said capacitor retaining said charge until said electron discharge tube is made conducting, and an output circuit connected across said capacitor.

3. A pulse conversion circuit comprising a differentiating circuit, means to impress a signal pulse of predetermined polarity upon the input of said differentiating circuit, a D. C. restorer and a limiting amplifier connected to the output of said differentiating circuit, a pulse generator keyed by the output of said amplifier for producing pulses of constant duration, an electron discharge tube having at least anode and cathode electrodes, a point of fixed potential, bias means negative with reference to said point of fixed potential and connected to said anode to maintain said tube normally blocked, a capacitor connected between said cathode and said point of fixed potential, a unilateral impedance connected between the output of said differentiating circuit and the junction of said cathode and condenser whereby the said condenser is charged to a potential determined by the amplitude of each signal pulse, means disposed intermediate said generator and said discharge tube responsive to the trailing edge of the pulses in the output of said pulse generator to render said electron discharge tube conducting and effect a discharge of said capacitor, and an output circuit connected across said capacitor.

4. A conversion network for spaced pulses, comprising a condenser, an electron discharge tube circuit in series with said condenser for controlling the discharge thereof, means normally blocking said discharge tube circuit, unidirectionally conducting means forming a path for said pulses to said condenser to permit charging thereof, separate circuit means including a pulse generator for producing, in response to the application of said pulses thereto, output pulses having constant duration, means for applying said output pulses to said discharge circuit and said blocking means to render said blocking means ineffective and discharge said condenser, and an output circuit for said condenser.

CARLTON A. MIZEN.

REFERENCES CITED

The following references are of record in the file of this patent:

UNITED STATES PATENTS

| Number | Name | Date |
|---|---|---|
| 2,399,135 | Miller et al. | Apr. 23, 1946 |
| 2,419,340 | Easton | Apr. 22, 1947 |
| 2,439,321 | Starr | Apr. 6, 1948 |